United States Patent [19]
Koseki

[11] Patent Number: 5,800,883
[45] Date of Patent: Sep. 1, 1998

[54] AIRBAG OF AIRBAG RESTRAINT SYSTEM

[75] Inventor: Tomohiro Koseki, Hamamatsu, Japan

[73] Assignees: Ikeda Bussan Co., Ltd., Ayase; Hamamatsu Industry Co., Ltd., Hamamatsu, both of Japan

[21] Appl. No.: 710,739

[22] Filed: Sep. 20, 1996

Related U.S. Application Data

[63] Continuation of Ser. No. 279,099, Jul. 22, 1994, abandoned.

[30] Foreign Application Priority Data

Jul. 30, 1993 [JP] Japan .................. 5-208489

[51] Int. Cl.⁶ .................. B05D 1/18; B61R 21/16
[52] U.S. Cl. .................. 428/35.2; 428/35.5; 428/36.1; 428/290; 428/423.1; 428/921; 280/728.1; 280/743.1; 427/365; 427/389.9; 427/430.1; 427/434.2
[58] Field of Search .................. 280/728.1, 729, 280/730.1, 743.1; 428/35.2, 36.1, 290, 289, 423.1, 921, 287, 35.5; 427/365, 489.9, 430.1, 434.2

[56] References Cited

U.S. PATENT DOCUMENTS

| | | | |
|---|---|---|---|
| 3,874,693 | 4/1975 | Patzelt et al. .................. | 280/731 |
| 5,141,787 | 8/1992 | Yamamoto .................. | 428/36.1 |
| 5,178,938 | 1/1993 | Magistro et al. .................. | 428/287 |
| 5,215,795 | 6/1993 | Matsumoto et al. .................. | 280/728 R |
| 5,302,432 | 4/1994 | Shigeta et al. .................. | 428/36.1 |
| 5,336,538 | 8/1994 | Kitamura .................. | 280/728 R |
| 5,358,986 | 10/1994 | Onofusa et al. .................. | 524/284 |
| 5,401,566 | 3/1995 | Magee et al. .................. | 428/36.1 |

FOREIGN PATENT DOCUMENTS 5469543  10/1952  Japan .

Primary Examiner—Rena L. Dye
Attorney, Agent, or Firm—Foley & Lardner

[57] ABSTRACT

An airbag of an airbag restraint system mounted on an automotive vehicle and adapted to protect a vehicle passenger in a serious vehicle collision. The airbag is formed of front and rear side sheet-like members which are sewn with each other at their peripheral portions to be bag-shaped. Each sheet-like member includes a cloth which is woven with warp and weft yarns formed of polyester resin or nylon 6, 6 fibers. The cloth is impregnated with a resinous material including a polyurethane resin adhesive for the fibers, so that the yarns of the sheet-like member are bound with each other thereby effectively preventing fray from occurrence even upon cutting of the sheet-like member.

9 Claims, 2 Drawing Sheets

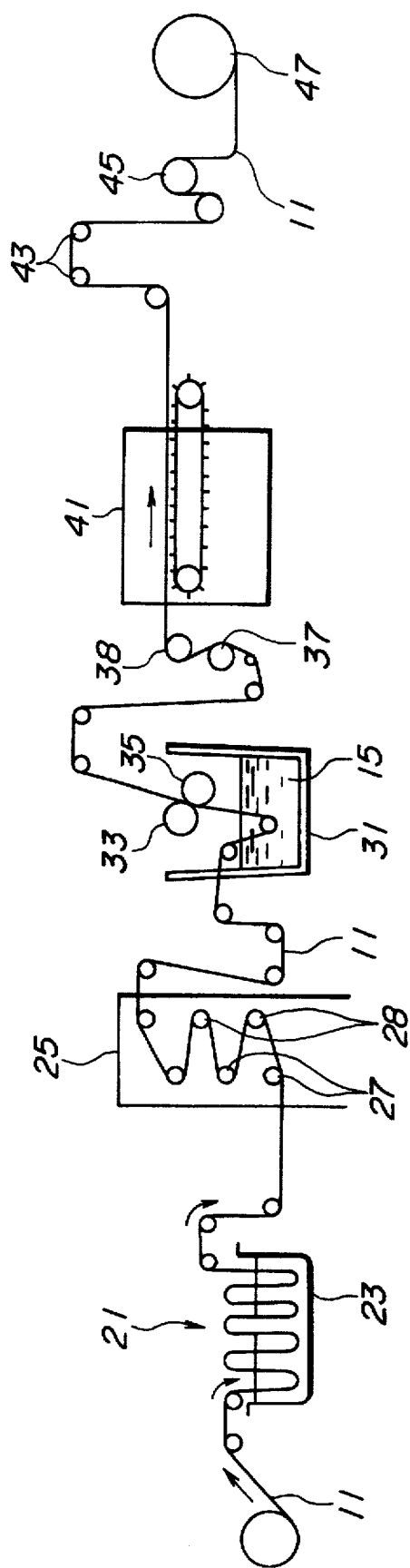

AIRBAG OF AIRBAG RESTRAINT SYSTEM

This application is a continuation of application Ser. No. 08/279,099, filed Jul. 22, 1994, now abandoned.

BACKGROUND OF THE INVENTION

1. Field of the Invention

This invention relates to improvements in an airbag of an airbag restraint system for protecting a vehicle passenger in the event of a serious vehicle collision or the like, and more particularly to a sheet-like member constituting such an airbag connected to a gas generator and adapted to inflate upon being supplied with gas from the gas generator.

2. Description of the Prior Art

Hitherto a variety of airbag restraint systems have been proposed and put into practical use in the field of automotive vehicles. An example of the airbag restraint system is disclosed in Japanese Patent Publication No. 56-43890. An example of a device for securely retaining the airbag to a stationary side of the vehicle is disclosed in Japanese Utility Model Provisional Publication No. 54-69543.

In general, such an airbag restraint system includes a gas generator which is fixed to a base plate installed to a stationary side of the vehicle such as an instrument panel or a steering wheel. An airbag is fixed to the base plate through a retainer and adapted to momentarily inflate upon being supplied with high pressure gas from the gas generator when the gas generator is operated in the event of a serious vehicle collision or the like.

The airbag is formed of cloth materials each of which is constituted of warp and weft yarns as basic materials. The cloth materials are coated with a coating material or not coated and obtained by cutting a cloth in a manner to have predetermined shapes and areas.

For example, the airbag is formed of generally circular front and rear side cloth materials which are sewn at their peripheral portions with each other. The rear side cloth material is formed with a gas inlet opening through which high pressure gas from the gas generator is supplied.

Difficulties have been encountered in the above-discussed airbag of the airbag restraint system in case of using a conventional non-coat cloth material which is not coated. That is, fray is unavoidably made at the peripheral portions and the through-opening portions of the cloth materials in case of cutting the cloth materials by a press, thereby resulting in substandard airbags and degrading the efficiency of sewing operation of the airbag. In order to overcome the difficulties, it has been proposed to cut the cloth materials by using laser, a ultrasonic cutter, a high frequency cutter. However, the cutting by using laser or the like requires a long operation time thereby to degrade the productivity while requiring a high equipment cost.

Otherwise, the sewing operation is made upon folding the peripheral portions of the cloth materials. However, it is inferior from the economical view point particularly when a folded portion is large in size. Additionally, it provides such a disadvantage that folding cannot be made particularly at the through-opening portions, so that tear occurs from the through-opening portions when the airbag inflates upon supply of high pressure gas.

Furthermore, difficulties have been encountered also in case of using a conventional coated cloth material which is coated with a heat-resistant resin material such as chloroprene resin or silicone rubber. That is, although fray of the cloth materials can be prevented, a process for coating such a resin material worsen an operational circumstance in a production line, and such a heat-resistant and high-sealing ability resin material is expensive. Additionally, a high coating technique and special facility for solvent recovery and drying are required to obtain a high precision coating of the micron order. As a result, the cost of resultant coated cloth materials is unavoidably increased.

SUMMARY OF THE INVENTION

It is an object of the present invention to provide an improved airbag of an airbag restraint system, which can overcome the drawbacks encountered in conventional airbags.

Another object of the present invention is to provide an improved airbag of an airbag restraint system, which is largely improved in sewing operational efficiency for cloths forming a major part of the airbag, and excellent from an economical view point. A further object of the present invention is to provide an improved airbag of an airbag restraint system, by which cloths forming a major part of the airbag can be effectively prevented from being frayed without a considerable rise in production cost.

A still further object of the present invention is to provide an improved airbag of an airbag restraint system, which can maintain a high air tightness without requiring an expensive production equipment and without worsening an operational circumference in a production line.

An airbag of an airbag restraint system, of the present invention comprises a sheet-like member forming a major part of the airbag. The sheet-like member includes a cloth including warp and weft yarns which are made of synthetic fibers. The cloth is impregnated with a resinous material which includes an adhesive for bonding the yarns, the adhesive including polyurethane resin, an antioxidant, and a flame retarder.

According to the present invention, the cloth forming a major part of the airbag is impregnated with the resinous material including the adhesive for bonding the yarns, and therefore the fibers of the warp and weft yarns are bonded with each other and made integral with each. Accordingly, the cloth impregnated with the resinous material can be easily cut without occurrence of fray at a cut position. Additionally, it provides a high air tightness of the airbag.

BRIEF DESCRIPTION OF THE DRAWINGS

FIG. 2 is a flow diagram of a production process of a sheet-like member forming a major part of the airbag.

DETAILED DESCRIPTION OF THE INVENTION

Figure 1:
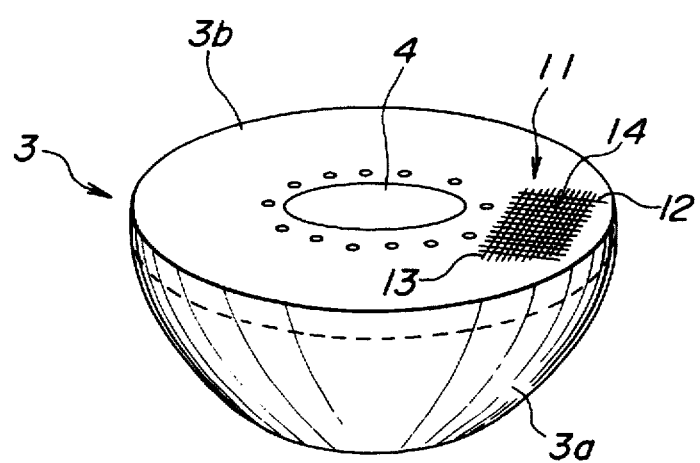
FIG. 1 is a perspective view of an embodiment of an airbag of an airbag restraint system, in accordance with the present invention.

Referring now to FIG. 1, an embodiment of an airbag according to the present invention is illustrated by the reference numeral 3. The airbag 3 forms part of an airbag restraint system of an automotive vehicle though not shown. The airbag 3 is designed to momentarily inflate in the event of a serious vehicle collision in order to provide a soft cushion for a vehicle passenger (not shown) thereby protecting the vehicle passenger from coming into direct contact with either a steering wheel (not shown) or a windshield (not shown).

The airbag 3 in FIG. 1 is in an inflated state and includes a front side sheet-like member or cloth material 3a which faces the vehicle passenger. A rear side sheet-like member or cloth material 3b is sewed at its peripheral portion to the front side sheet-like member 3a at the peripheral portion. The rear side sheet-like member 3b is formed at its central portion with an opening 4 through which high pressure gas is supplied to inflate the airbag 3. It will be understood that high pressure gas is ejected from a gas generator (not shown) which is fixed to a base plate installed to a stationary side of the vehicle such as an instrument panel (not shown) or the steering wheel, so that high pressure gas is momentarily flown into the airbag to momentarily inflate the airbag 3 to receive the vehicle passenger.

Each of the front and rear side sheet-like members 3a, 3b is formed of a cloth or fabric 11 of plain weave or the like. The cloth 11 is woven with basic weaving materials including warp yarn 12 and weft yarns 13. The warp and weft yarns 12, 13 are formed of fibers made of a polymer material having a relatively high melting point. The high polymer material is polyester or nylon 6, 6 which is high in heat resistance. It will be understood one or some yarns formed of fibers made of a low melting point high polymer material may be mixed with and woven in at least one of warp yarns 12 and weft yarns 13. The low melting point high polymer material is lower in melting point than the high melting point high polymer material of the warp and weft yarns 12, 13.

The airbag 3 is arranged to be inflated and projected toward the vehicle passenger under operation of the gas generator, and therefore the cloth 11 of the airbag 3 is high in density of yarns (the number of yarns per unit length of the cloth) to omit air-permeability thereof. In this regard, there are two examples of the cloth 11 (plain weave fabric), having the following thickness of warp and weft yarns 12, 13: (a) 420 denier (249 filaments constituting a yarn) in case that the yarn fibers are made of polyester resin; and (b) 315 denier (72 filaments constituting a yarn) in case that the yarn fibers are made of nylon 6, 6. It will be understood that the denier means a weight (g) per 9000 m. In these examples, the yarns formed of the fibers made of the high melting point material such as polyester or nylon 6, 6 have a melting point ranging from 230° to 250° C.

The cloth 11 is coated with a resinous material 14 which includes an adhesive for bonding the yarns, an antioxidant for the adhesive and a flame retarder (mentioned after), and the flame retarder for the cloth 11, the adhesive and the antioxidant. Coating of such a resinous material 14 is accomplished as follows: The cloth 11 is dipped in a resinous liquid (15) containing a polyurethane resin emulsion (containing the adhesive), the antioxidant (for addition to aqueous resin liquid), and the flame retarder, so that the cloth 11 is impregnated with the resinous material 14; and then the cloth 11 impregnated with the resinous material 14 is subjected to a heat treatment to harden the adhesive. After the heat treatment, the amount of the resinous material impregnated in or attached to the cloth 11 is preferably 1 to 10 g/m². Additionally, after the heat treatment, the resinous material 14 preferably includes 50 to 85% by weight of the adhesive, 0.5 to 10% by weight of the antioxidant, and 10 to 45% by weight of the flame retarder.

A process of production of the cloth 11 for the airbag 3 will be discussed with reference to FIG. 2.

After the cloth 11 has been formed by weaving yarns formed of the fibers made of polyester and/or nylon 6, 6, the cloth 11 is subjected to a thermal setting as a pre-treatment in this production process. This thermal setting includes refining the cloth 11 by a refining device 21, and correcting of the texture of the cloth 11 by a texture correcting device 25. More specifically, the woven cloth 11 is first dipped in a NaOH aqueous solution (no numeral) contained in a refining bath 23 forming part of the refining device 21 in order to remove spinning oil from the cloth 11. In this step, the cloth 11 is stayed in the NaOH aqueous solution at a temperature ranging from 60° to 90° C. for a time of about 2 minutes. Subsequently, the cloth 11 is passed on a plurality of rollers 27, 28 forming part of the texture correcting device 25 in order to correct the texture of the cloth 11 or regulate the bow of the cloth 11. After passing through the texture correcting device 25, the cloth 11 is dried.

Then, the cloth 11 is dipped in the resinous liquid 15 contained in a dipping bath 31 in order to accomplish a dipping treatment for the cloth 11. The resinous liquid 15 includes the adhesive (for bonding the yarns), the antioxidant, and the flame retarder which are mixed with water. In other words, the resinous liquid includes a large amount of water. The adhesive is in the state of an emulsion (having a solid content of 50%) of polyurethane resin represented by a formula (I).

The antioxidant is formed of an amine compound. An example of the antioxidant is "Uniguard M-13" which is a trade name of Dai-ichi Kogyo Seiyaku Co., Ltd. in Japan and is for the resinous liquid in an aqueous system. The flame retarder includes an organic phosphorus-halogen compound represented by a formula (II), brominated aromatic compound and/or brominated inorganic compound.

where R is an alkyl group; and n is a number ranging from 10 to 20.

An example of composition of the resinous liquid 15 includes 26.6 g/l of the emulsion (the adhesive), 2.6 g/l of the antioxidant, and 12.5 g/l of the flame retarder. Thereafter, the cloth 11 is drawn up out of the dipping bath 31 and is passed through between squeezing rollers 33, 35 to squeeze an excess resinous liquid. In this example, this squeezing is set at a pick-up percentage of 35%. In other words, 65% of the resinous liquid is removed from the cloth 11, so that 35% of the resinous liquid remains on the cloth 11.

The cloth 11 drawn out from the squeezing rollers 33, 35 is fed to feed rollers 37, 38 to regulate the density and the like of the cloth 11, and thereafter is introduced into a heating furnace 41 to dry or heat-treat the cloth 11 at a temperature ranging from 80° to 130° C. for a time ranging from 1 to 3 minutes. Subsequently, the cloth 11 is drawn out of the heating furnace 41 and cooled, and then passed on rollers 43, 45 to again correct the texture of the cloth 11. The cloth 11 from the rollers 43, 45 are rolled up by a take-up roller 47.

EXPERIMENT

In order to evaluate the airbag according to the present invention, experiments were conducted to compare a variety of performances between the sheet-like member (3a, 3b) of the airbag 3 of the present invention and a conventional similar sheet-like member (cloth) in both cases of using polyester resin fibers as the material of the yarns and of using nylon 6, 6 fibers as the material of the yarns. Therefore, four kinds of test samples were prepared as shown at items 1), 2) and 3) in Table 1. It will be understood that the cloths (11) were common throughout two kinds (using polyester resin fibers) of test samples, and common throughout the other two kinds (using nylon 6, 6-made yarns) of the test samples or sheet-like members as indicated at item 1) in Table 1, in which "de" designates denier of the yarn, and "f" designates fibers constituting a yarn; and "density" indicates the number of yarns per inch.

In order to prepare the former two kinds of the test samples, the cloths (11) were subjected to a resin treatment to be impregnated with the resinous material 14 in accordance with the process shown in FIG. 2. In this treatment, the cloths (11) were subjected to the thermal setting as shown at item 2) in Table 1. Additionally, in the treatment, the emulsion (the adhesive) resinous liquid (15) contained 34.6 g/l of the adhesive, 3.4 g/l of the antioxidant and 16.3 g/l of the flame retarder, as indicated at item 3) in Table 1. The pick-up percentage was 35%, so that the amount of the resinous material (14) attached to or impregnatd in the cloth (11) was 7 g/m² in case of using the polyester fibers and 5 g/m² in case of using the nylon 6, 6 fibers after dried or heat-treated.

In order to prepare the latter two kinds of the test samples, the cloths (11) were subjected only to the thermal setting but not subjected to the resin treatment as indicated at item 3) of Table 1.

Tests were conducted on four kinds of the test samples (corresponding to the sheet-like members 3a, 3b) to evaluate the performance of them. The tests include the following measurements (test results are shown at item 4) in Table 1), in which each value in item 4) is an average value of five measured values:

a) Fray resistance

The measurement of the fray resistance was carried out by pulling a yarn at the peripheral portion of a cloth or the sheet-like member (having a dimension of 10 cm×10 cm) and by reading a load (g) on a load meter when the yarn was frayed from the cloth. This measurement was made on the warp yarn (indicated by "Warp Y." in Table 1) and on the weft yarn (indicated by "Weft Y." in Table 1.

b) Air permeability

The measurement of an air passing amount (cc/cm²/sec) was carried out according to Japanese Industrial Standard (JIS) L 1096-6.27 in two directions of the sample to obtain the air permeability. One (indicated by "D1" in Table 1) of the directions was from the right side to the back side of the cloth or sheet-like member (3a, 3b), while the other direction (indicated by "D2" in Table 1) was from the back side to the right side.

c) Flammability

The measurement of a burning speed (mm/min) of the cloth or sheet-like member (3a, 3b) was carried out according to FMVSS No. 302 (in the United States of America) in a fore-and-aft direction (indicated by "S1" in Table 1) and in a lateral direction (indicated by "S2" in Table 1) to obtain the Flammability. "DN1" in Table 1 indicates that the sample cannot be ignited.

d) Tensile strength

The measurement of a value (KN) of the cloth or sheet-like member (3a, 3b) having a width of 30 mm was carried out according to JIS K6328-5.3.5 in a fore-and-aft direction (indicated by "S1" in Table 1) and in a lateral direction (indicated by "S2" in Table 1) to obtain the tensile strength.

e) Tear strength

The measurement of a value (KN) of the cloth or sheet-like member (3a, 3b) was carried out according to JIS K6328-5.3.6 in a fore-and-aft direction (indicated by "S1" in Table 1) and in a lateral direction (indicated by "S2" in Table 1) to obtain the tear strength.

It will be apparent from Table 1, the sheet-like member (with the resinous material 14) of the present invention is higher in the fray resistance about 5 times than the conventional sheet-like member (without the resinous material), and is much lower in the air permeability than the conventional one. Therefore, the sheet-like member of the present invention can be effectively prevented from fraying at the peripheral portions and the through-opening sections of the cloth 11 even upon cutting of the cloth 11, thereby greatly facilitating a sewing operation of the airbag 3. Additionally, an air tightness of the airbag of the present invention can be largely improved.

TABLE 1

| ITEM | | | | FIBER | | | |
|---|---|---|---|---|---|---|---|
| | | | | POLYESTER | | NYLON 6,6 | |
| 1) BASIC WEAVING MATERIAL | CLOTH | YARNS | WARP Y. | 420de1249f | | 315de172f | |
| | | | WEFT Y. | 420de/249f | | 315de172f | |
| | | DENSITY | WARP Y. | 58 | | 63 | |
| | | | WEFT Y. | 58 | | 63 | |
| 2) THERMAL SETTING | | | | MADE | MADE | MADE | MADE |
| 3) RESIN TREATMENT | RESINOUS LIQUID | ADHESIVE | | — | 34.6 g/l | — | 34.6 g/l |
| | | ANTIOXIDANT | | — | 3.4 g/l | — | 3.4 g/l |
| | | FLAME RETARDER | | — | 16.3 g/l | — | 16.3 g/l |
| | PICK-UP PERCENTAGE | | | — | 35% | — | 35% |
| | IMPREGNATED AMOUNT (g/m²) | | | — | 7 | — | 5 |
| 4) PERFORMANCE | FRAY RESISTANCE (g) | | WARP Y. | 4.7 | 31.0 | 4.9 | 30.2 |
| | | | WEFT Y. | 8.2 | 44.2 | 6.8 | 28.5 |
| | AIR PERMEABILITY (cc/cm²/sec) | | D1 | 0.185 | 0.07 | 0.110 | 0.060 |
| | | | D2 | 0.179 | 0.06 | 0.101 | 0.057 |
| | FLAMMABILITY (mm/sec) | | S1 | 0 | 0/DNI | 0 | 0/DNI |
| | | | S2 | 0 | 0/DNI | 0 | DNI |
| | TENSILE STRENGTH (KN) | | S1 | 2.365 | 2.473 | 1.683 | 1.743 |
| | | | S2 | 2.447 | 2.605 | 1.533 | 1.565 |
| | TEAR STRENGTH (KN) | | S1 | 0.175 | 0.201 | 0.124 | 0.148 |
| | | | S2 | 0.168 | 0.178 | 0.134 | 0.152 |

What is claimed is:

1. An airbag of an airbag restraint system, comprising:

a single-layer sheet member forming a major part of the airbag, said sheet member consisting essentially of a single-layer cloth formed of warp and weft synthetic fiber yarns of at least one selected from the group consisting of polyester resin and nylon 6, 6, and impregnated with a resinous material, said resinous material including an adhesive for bonding said yarns, said adhesive including polyurethane resin, an antioxidant for oxidizable components, and a flame retarder for burnable components.

2. An airbag as claimed in claim 1, wherein said antioxidant includes an amine compound.

3. An airbag as claimed in claim 1, wherein said flame retarder includes at least one selected from the group consisting of an organic phosphorus-halogen compound, a brominated aromatic compound and a brominated inorganic compound.

4. An airbag as claimed in claim 1, wherein said resinous material is impregnated in said cloth in an amount of 1 to 10 g/m$^2$ in a dried state.

5. An airbag as claimed in claim 1, wherein said resinous material in a dried state includes 50 to 85% by weight of said adhesive, 0.5 to 10% by weight of said antioxidant, and 10 to 45% by weight of said flame retarder.

6. An airbag of an airbag restraint system, comprising:

a single-layer sheet member forming a major part of the airbag, said sheet member consisting essentially of a single-layer cloth formed of warp and weft synthetic fiber yarns of at least one selected from the group consisting of polyester resin and nylon 6, 6, and impregnated with a resinous material, said resinous material including an adhesive for bonding said yarns, said adhesive including polyurethane resin, an antioxidant for oxidizable components, and a flame retarder for burnable components, wherein said single-layer cloth is impregnated with said resinous material by:

thermally setting said cloth, dipping said cloth in a resinous liquid containing an emulsion containing the polyurethane resin, the antioxidant and the flame retarder, squeezing said cloth with said resinous liquid to remove excess resinous liquid, and heat-treating said cloth with said resinous material.

7. The airbag of claim 1, wherein the warp and weft yarns are formed of fibers having a melting point in a range from 230° to 250° C.

8. The airbag of claim 6, wherein the warp and weft yarns are formed of fibers having a melting point in a range from 230° to 250° C.

9. An airbag of an airbag restraint system, comprising:

a single-layer sheet member forming a major part of the airbag, the sheet member consisting essentially of a single-layer cloth formed of warp and weft synthetic fiber yarns of at least one selected from the group consisting of polyester resin and nylon 6, 6, and impregnated with a resinous material, the resinous material including an adhesive for bonding the yarns, the adhesive including polyurethane resin, an antioxidant for oxidizable components, and a flame retarder for burnable components, wherein the single-layer cloth is impregnated with the resinous material by:

thermally setting the cloth, dipping the cloth in a resinous liquid containing an emulsion containing the polyurethane resin, the antioxidant and the flame retarder, passing the cloth with the resinous liquid between squeezing rollers to remove excess resinous liquid, and heat-treating the cloth with the resinous material.

* * * * *